US012567150B2

(12) United States Patent
El-Zehiry et al.

(10) Patent No.: US 12,567,150 B2
(45) Date of Patent: Mar. 3, 2026

(54) EDITING PRESEGMENTED IMAGES AND VOLUMES USING DEEP LEARNING

(71) Applicant: SIEMENS HEALTHINEERS AG, Forchheim (DE)

(72) Inventors: Noha El-Zehiry, Plainsboro, NJ (US); Gareth Funka-Lea, Princeton, NJ (US); Athira Jane Jacob, Plainsboro, NJ (US); Paul Klein, Princeton, NJ (US)

(73) Assignee: Siemens Healthineers AG, Forchheim (DE)

( * ) Notice: Subject to any disclaimer, the term of this patent is extended or adjusted under 35 U.S.C. 154(b) by 508 days.

(21) Appl. No.: 17/811,329

(22) Filed: Jul. 8, 2022

(65) Prior Publication Data

US 2023/0060113 A1    Feb. 23, 2023

Related U.S. Application Data

(60) Provisional application No. 63/260,331, filed on Aug. 17, 2021.

(51) Int. Cl.
*G06T 7/11* (2017.01)
*G06N 3/08* (2023.01)
G06V 10/26 (2022.01)

(52) U.S. Cl.
CPC ................. *G06T 7/11* (2017.01); *G06N 3/08* (2013.01); *G06T 2207/20081* (2013.01);
(Continued)

(58) Field of Classification Search
CPC ............. G06T 7/11; G06T 2207/20081; G06T 2207/20084; G06T 2207/20092; G06N 3/08; G06N 3/0464
See application file for complete search history.

(56) References Cited

U.S. PATENT DOCUMENTS

| | | | |
|---|---|---|---|
| 11,676,279 B2 * | 6/2023 | Price ...................... | G06N 3/088 382/156 |
| 2017/0301085 A1 * | 10/2017 | Riklin Raviv ......... | G16H 40/63 |

(Continued)

FOREIGN PATENT DOCUMENTS

WO    WO-2021121631 A1 *  6/2021  ............. G06N 3/045

OTHER PUBLICATIONS

G Berdell, C Tanner, and E Konukoglu. "Iterative interaction training for segmentation editing networks." Machine Learning in Medical Imaging: 9th Intl. Workshop, MLMI 2018, Granada, Spain, Sep. 16, 2018. Springer International Publishing, 2018. Accessed Nov. 26, 2024 via [https://arxiv.org/pdf/1807.08555] (Year: 2018).*

(Continued)

*Primary Examiner* — Aaron W Carter
*Assistant Examiner* — Joshua B. Crockett

(57) ABSTRACT

Systems and methods for generating an updated segmentation of an initial segmentation are provided. An initial segmentation of an anatomical object from an input medical image is received. User input modifying the initial segmentation is received. An updated segmentation of the anatomical object in the input medical image is generated using a machine learning based network based on at least one of the initial segmentation and the user input. The updated segmentation is output.

13 Claims, 9 Drawing Sheets

(52) U.S. Cl.
    CPC .............. *G06T 2207/20084* (2013.01); *G06T
        2207/20092* (2013.01); *G06V 10/26* (2022.01)

(56) References Cited

U.S. PATENT DOCUMENTS

| | | | |
|---|---|---|---|
| 2018/0276815 A1* | 9/2018 | Xu ........................ | G06V 10/987 |
| 2019/0261945 A1* | 8/2019 | Funka-Lea ........... | A61B 8/0883 |
| 2020/0167930 A1* | 5/2020 | Wang ........................ | G06N 3/08 |
| 2020/0250880 A1* | 8/2020 | Groth ................. | G06F 3/04845 |
| 2021/0090251 A1* | 3/2021 | Jha ........................ | G06V 10/764 |
| 2022/0375099 A1* | 11/2022 | Schulz .................. | G06T 7/0012 |
| 2023/0196698 A1* | 6/2023 | Gogin .................... | G06T 19/00 |
| | | | 345/419 |
| 2024/0386572 A1* | 11/2024 | Barasofsky .............. | G06T 7/11 |

OTHER PUBLICATIONS

G. Wang et al., "Interactive Medical Image Segmentation Using Deep Learning With Image-Specific Fine Tuning," in IEEE Transactions on Medical Imaging, vol. 37, No. 7, pp. 1562-1573, Jul. 2018. Accessed Apr. 26, 2025 via <https://ieeexplore.ieee.org/document/8270673> (Year: 2018).*

Zhang et al. "Interactive Object Segmentation With Inside-Outside Guidance," 2020 IEEE/CVF Conference on Computer Vision and Pattern Recognition (CVPR), Seattle, WA, USA, 2020, pp. 12231-12241, accessed Nov. 14, 2025 via <https://ieeexplore.ieee.org/document/9157733> (Year: 2020).*

* cited by examiner

300

Initial 3D segmentation                    Updated 3D segmentation

<u>800</u>

EDITING PRESEGMENTED IMAGES AND VOLUMES USING DEEP LEARNING

This application claims the benefit of U.S. Provisional Application No. 63/260,331 filed Aug. 17, 2021, the disclosure of which is herein incorporated by reference in its entirety.

TECHNICAL FIELD

The present invention relates generally to image segmentation, and in particular to accurate image segmentation using user input in conjunction with deep learning.

BACKGROUND

Image segmentation is an important step in image analysis, in particular for the analysis of medical images. Currently, various methods for automatic segmentation exist. Such segmentation is often a preliminary step for any image processing pipeline that utilizes artificial intelligence in the clinical setting. While deep learning technologies have improved the accuracy of automatic segmentation in many applications and modalities, the accuracy of the current methods of automatic segmentation remains limited. The reasons for inaccurate automatic segmentation include, for example, poor input image quality, discrepancy between the training and testing distributions, and acquisition protocols that are not followed properly by a technician, each leading to images or volumes that are not well recognized by the segmentation algorithm.

Some conventional approaches provide editing tools that enable the clinicians to provide user input to manually correct the segmentation. However, these approaches require the user input to be very accurate and may not provide smooth transitions between the user input and previously determined segmentation boundaries.

Accordingly, there is a need for providing accurate and smooth editing of boundaries within images or volumes.

BRIEF SUMMARY OF THE INVENTION

In accordance with one or more embodiments, a system and method for using deep learning to train a model to learn from collected user inputs, prior segmentation of images, and image features is disclosed.

Embodiments described herein leverage a large amount of data to learn how to edit a segmented volume as compared to conventional editing methods. This enables a higher quality segmentation with minimal user input. This increases the segmentation performance while minimizing cost associated with the editing process wherever accurate image segmentation is needed, and is not limited to any particular imaging modality or use case.

In an embodiment, systems and methods for generating an updated segmentation of an initial segmentation are provided. An initial segmentation of an anatomical object from an input medical image is received. User input modifying the initial segmentation is received. An updated segmentation of the anatomical object in the input medical image is generated using a machine learning based network based on at least one of the initial segmentation and the user input. The updated segmentation is output.

In an embodiment, the updated segmentation of the anatomical object in the input medical image is generated using the machine learning based network based on the input medical image.

In an embodiment, a 3D initial segmentation of the anatomical object from a 3D volume is received. The user input is received on a 2D (two dimensional) slice of the 3D volume. The user input is mapped from the 2D slice to the 3D initial segmentation.

In an embodiment, a 3D initial segmentation of the anatomical object from a 3D volume is received. User input modifying the 3D initial segmentation is received in a 3D coordinate system.

In an embodiment, a plurality of user inputs modifying the initial segmentation is received. The updated segmentation of the anatomical object in the input medical image is generated based on the plurality of user inputs.

In an embodiment, one or more additional user inputs are received. For each respective additional user input of the one or more additional user inputs, the steps of receiving the initial segmentation, receiving the user input, generating the updated segmentation, and outputting the updated segmentation are iteratively repeated using the respective additional user input as the user input and the updated segmentation as the initial segmentation.

In an embodiment, the initial segmentation and the user input are received via respective input channels of the machine learning based network and combined together. In an embodiment, each input channels is weighted.

In an embodiment, the user input modifying the initial segmentation is received by receiving user input adding a new contour to the initial segmentation, deleting a portion of the initial segmentation, or moving a portion of the initial segmentation.

These and other advantages of the invention will be apparent to those of ordinary skill in the art by reference to the following detailed description and the accompanying drawings.

DETAILED DESCRIPTION

The present invention generally relates to methods and systems for editing image segmentation. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system. Embodiments of the present invention will be described below with reference to the figures, where like reference numbers represent the same or similar elements.

Embodiments described herein provide for a unified platform for editing initial segmentations of an anatomical object from an input medical image. The unified platform is implemented using a machine learning based network that receives as input any combination of the input medical image, the initial segmentation, and/or user input modifying the initial segmentation and generates as output the updated segmentation. In one embodiment, the unified platform implements a geometric editing deep learning pipeline for receiving as input the initial segmentation and the user input and generates as output the updated segmentation. In another embodiment, the unified platform implements a smart editing deep learning pipeline for receiving as input the initial segmentation, the user input, and the input medical image and generates as output the updated segmentation. The disclosed embodiments leverage a large amount of data comprising medical images, initial segmentations, and user inputs that is used to train the machine learning based network for accurately updating the initial segmentation. Advantageously, embodiments discussed herein provide for a more accurately edited initial segmentation as compared to conventional methods, with minimal user input, to provide for a quick and cost effective editing tool.

Figure 1:
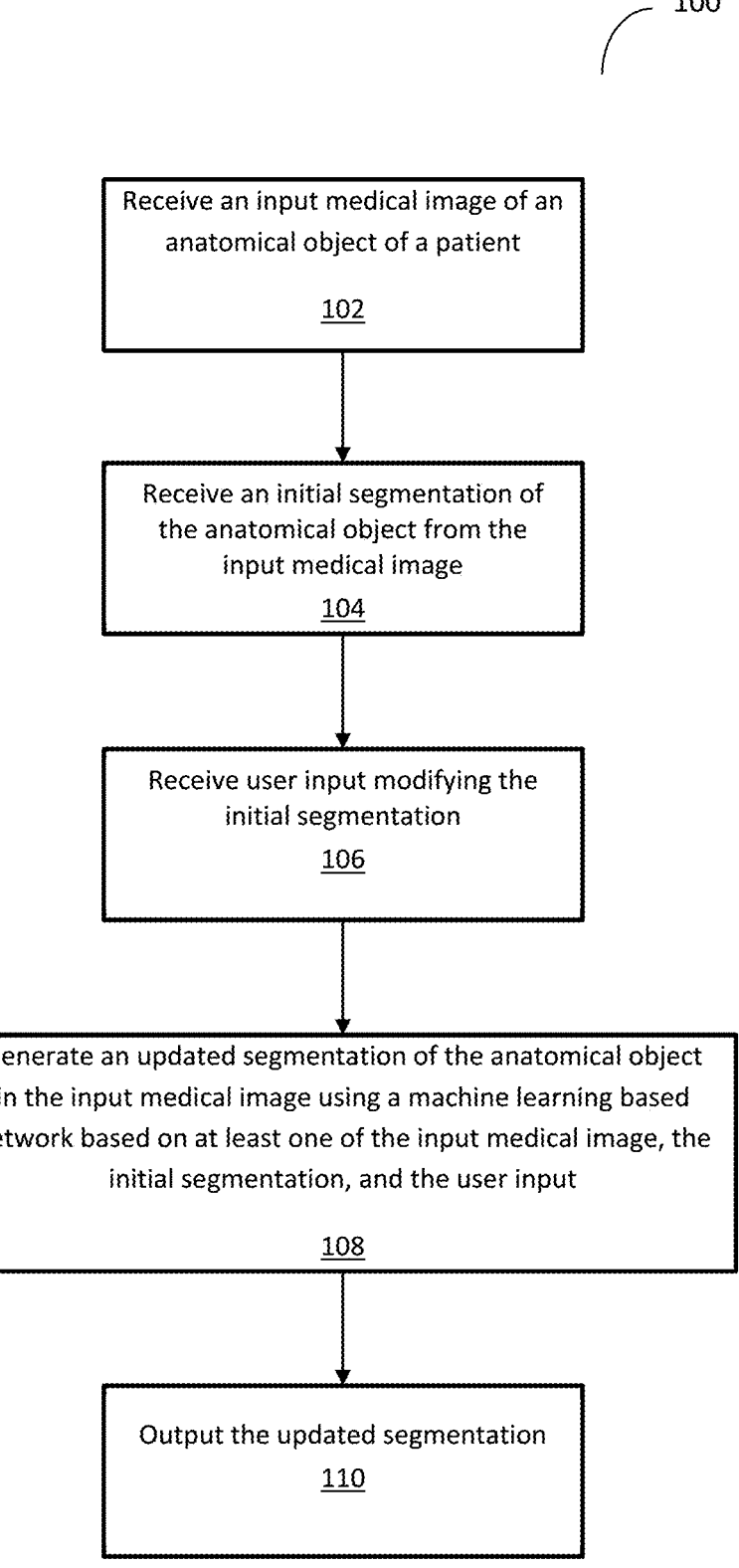
FIG. 1 is flowchart of a method for updating an initial segmentation of an anatomical object in an input medical image, in accordance with one or more embodiments.

FIG. 1 is flowchart of a method 100 for updating an initial segmentation of an anatomical object in an input medical image, in accordance with one or more embodiments. The steps of method 100 may be performed by one or more suitable computing devices, such as, e.g., computer 902 of FIG. 9.

At step 102 of FIG. 1, an input medical image of an anatomical object of a patient is received. The anatomical object may comprise an organ, a bone, lesions, or any other suitable anatomical object of the patient.

The input medical image may be of any suitable modality, such as, e.g., MRI (magnetic resonance imaging), CT (computed tomography), ultrasound, x-ray, or any other medical imaging modality or combinations of medical imaging modalities. The input image may be a 2D (two dimensional) image and/or a 3D (three dimensional) volume, and may comprise a single input medical image or a plurality of input medical images. Reference herein to pixels of an image are equally applicable to voxels of a volume (and vice versa). The input medical image may be received directly from an image acquisition device, such as, e.g., a CT scanner, or can be received by loading a previously acquired medical image from a storage or memory of a computer system or receiving a medical image that has been transmitted from a remote computer system.

At step 104 of FIG. 1, an initial segmentation of the anatomical object from the input medical image is received. The initial segmentation may be generated using any suitable approach, such as, e.g., machine learning and deep learning, random walker, thresholding, graph cuts, or any other suitable approach for segmenting the anatomical object from the input medical image. An exemplary initial segmentation is shown in FIG. 2A.

Figures 2A, 2B, 2C:
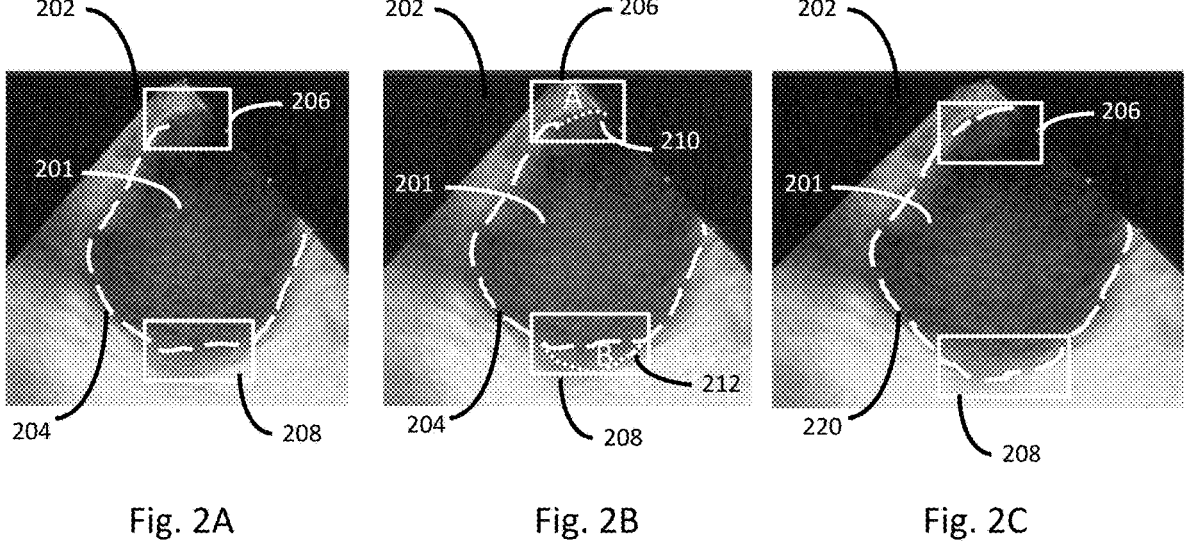
FIG. 2A shows an input medical image with an initial segmentation of an anatomical object overlaid thereon, in accordance with one or more embodiments.
FIG. 2B shows an input medical image with user input modifying an initial segmentation of anatomical object overlaid thereon, in accordance with one or more embodiments.
FIG. 2C shows input medical image with an updated segmentation of anatomical object overlaid thereon, in accordance with one or more embodiments.

FIG. 2A shows an input medical image 202 with an initial segmentation 204 of an anatomical object 201 overlaid thereon, in accordance with one or more embodiments. As shown in FIG. 2A, initial segmentation 204 comprises areas 206 and 208 where the initial segmentation 204 of anatomical object 201 is not accurate.

The initial segmentation may be received directly from an algorithm generating the initial segmentation as the initial segmentation is generated, or can be received by loading a previously generated initial segmentation from a storage or memory of a computer system or receiving an initial segmentation that has been transmitted from a remote computer system.

At step 106 of FIG. 1, user input modifying the initial segmentation is received.

The user input may comprise one or more suitable modifications of the initial segmentation by a user, such as, e.g., adding a new contour to the initial segmentation, deleting a portion of the initial segmentation, moving a portion of the initial segmentation, etc.

The user input may be received in any suitable manner. For example, the input medical image may be presented to the user via a display device with the initial segmentation overlaid thereon (e.g., as shown in FIG. 2A). User input is received from the user interacting with the initial segmentation (e.g., via mouse or touchscreen) to modify the initial segmentation. Exemplary user input is shown in FIG. 2B.

FIG. 2B shows input medical image 202 with user input modifying initial segmentation 204 of anatomical object 201 overlaid thereon, in accordance with one or more embodiments. As can be seen in FIG. 2B, a user adds new contour 210 to initial segmentation in area 206 and moves the contour of initial segmentation 204 in area 208 to contour 212 to modify initial segmentation 204.

At step 108 of FIG. 1, an updated segmentation of the anatomical object in the input medical image is generated using a machine learning based network based on at least one of the input medical image, the initial segmentation, and the user input. The machine learning based network may be any suitable machine learning based network for generating the updated segmentation. An exemplary network architecture of the machine learning based network is shown in FIG. 3A.

Figure 3A:
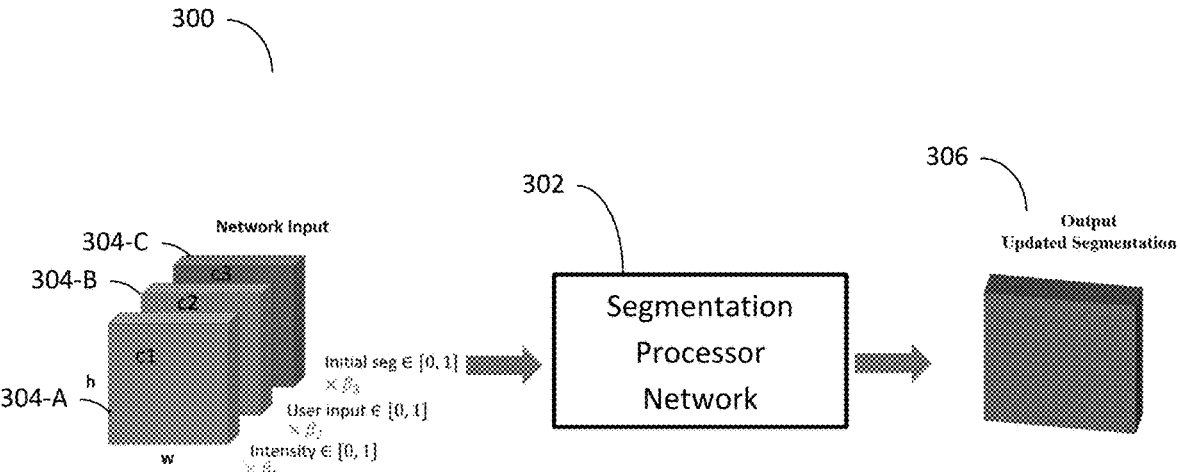
FIG. 3A shows an exemplary network architecture of a machine learning based network for generating an updated segmentation, in accordance with one or more embodiments.

FIG. 3A shows an exemplary network architecture 300 of a machine learning based network for generating an updated segmentation, in accordance with one or more embodiments. Segmentation processor network 302 receives an input medical image 304-A (represented as pixelwise or voxelwise intensities), user input 304-B, and initial segmentation 304-C (collectively referred to as network input 304) via input channels C1, C2, and C3 respectively, and generates as output updated segmentation 306. Each network input 304-A, 304-B, and 304-C has a pixelwise (or voxelwise) intensity value ranging between 0 and 1 and are respectively weighted by parameters $\beta_1$, $\beta_2$, and $\beta_3$. Weights $\beta$ may be defined by a user to assign an importance to each network input 304. In one embodiment where a particular network input, e.g., one or two of the network inputs 304-A, 304-B, and 304-C, is not utilized for generating the updated segmentation, the weight $\beta$ of the unutilized network input is assigned to a value of 0.

Figure 3B:
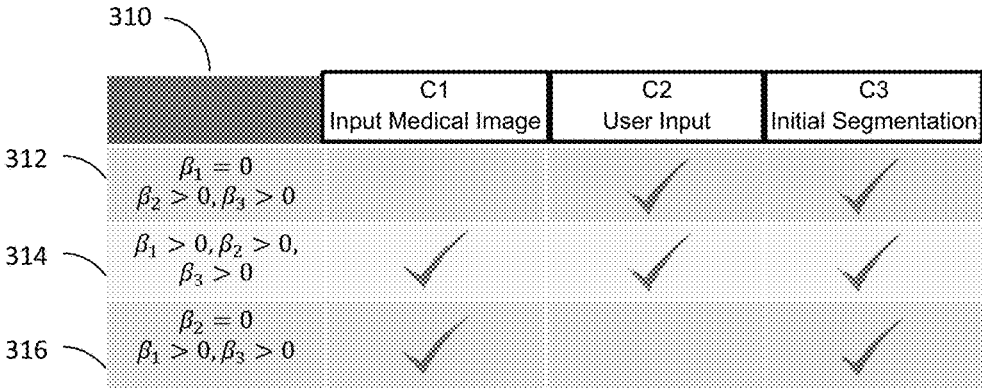
FIG. 3B shows a table showing weights for network inputs of segmentation process network, in accordance with one or more embodiments.

FIG. 3B shows a table 310 showing weights for network inputs 304 of segmentation process network 302, in accordance with one or more embodiments. In row 312, where user input 304-B and initial segmentation 304-C are utilized as input, but input medical image 304-A is not, network inputs 304 are weighted as $\beta_1=0$, $\beta_2>0$, and $\beta_3>0$. In row 314, where input medical image 304-A, user input 304-B, and initial segmentation 304-C are utilized as input, network inputs 304 are weighted as $\beta_1>0$, $\beta_2>0$, and $\beta_3>0$. In row 316, where input medical image 304-A and initial segmentation 304-C are utilized as input, but user input 304-B is not, network inputs 304 are weighted as $\beta_1>0$, $\beta_2=0$, and $\beta_3>0$.

The machine learning based network is trained during a prior offline or training stage using a set of training data. The training data may comprise a large amount of user inputs, initial segmentations, and medical images. Once trained, the trained machine learning based network is applied during an online or inference stage, for example, to perform step 108 of FIG. 1.

FIG. 2C shows input medical image 202 with an updated segmentation 220 of anatomical object 201 overlaid thereon, in accordance with one or more embodiments. As shown in FIG. 2C, areas 206 and 208 have been respectively updated based on user defined contours 210 and 212 of FIG. 2B to accurately segment anatomical object 201 from input medical image 202. Updated segmentation 220 has smoother transitions, as compared to initial segmentation 204, with user defined contours 210 and 212.

At step 110 of FIG. 1, the updated segmentation is output. For example, the updated segmentation can be output by displaying the updated segmentation on a display device of a computer system (e.g., by displaying the updated segmentation overlaid over the input medical image), storing the updated segmentation on a memory or storage of a computer system, or by transmitting updated segmentation to a remote computer system.

In one embodiment, the user input received at step 106 comprises a plurality of (e.g., all) input strokes from the user collected for the initial segmentation of the anatomical object in the input medical image. The steps of method 100 of FIG. 1 are performed once using the plurality of the input strokes as the user input at step 106 of FIG. 1 and an updated segmentation is generated once to update the initial segmentation. This could occur in the original image space or on a down-sampled version of the image where input strokes can be applied to the down-sampled version for computational efficiency.

In another embodiment, the user input received at step 106 comprises a single user input and the steps of method 100 are repeatedly performed for each user input to immediately update the initial segmentation based on that single user input. In this manner, the user sees the effect of the user input instantly. The user may continually provide inputs until they are satisfied to iteratively update the initial segmentation. The editing pipeline can run locally on a cropped volume where the changes take place only in the vicinity of the user's inputs rather than on the whole image. A workflow for iteratively updating the initial segmentation is shown in FIG. 4.

Figure 4:
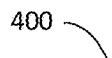
FIG. 4 shows a workflow for iteratively generating an updated segmentation of an anatomical object in an input medical image, in accordance with one or more embodiments.

FIG. 4 shows a workflow 400 for iteratively generating an updated segmentation of an anatomical object in an input medical image, in accordance with one or more embodiments. At step (1), an input medical image 402 with an initial segmentation 404 overlaid thereon is received. Initial segmentation 404 comprises areas 406 and 408 where the initial segmentation 404 of the anatomical object is not accurate. At step (2), the user provides a first user input in area 406 by drawing a correction stroke A 410 using, e.g., a mouse, and the editing process is triggered immediately upon mouse release. At step (3), region 405 of the input medical image 402 is cropped locally around the first user input and an updated segmentation is generated according to method 100 of FIG. 1 using the cropped region 405 as the input medical image, initial segmentation 404 as the initial segmentation, and the correction stroke A 410 as the user input. At step (4), the updated segmentation is stitched back to the original boundary of region 405 in input medical image 402 to provide a first updated segmentation, and the user provides a second user input stroke B 412. At step (5), region 407 of the input medical image 402 is cropped locally around the second user input and a second updated segmentation is generated according to method 100 of FIG. 1 using the cropped region 407 as the input medical image, initial segmentation 404 (as previously updated at step (3)) as the initial segmentation, and the correction stroke B 412 as the user input. At step (6), the second updated segmentation is stitched back to the original boundary of region 407 in input medical image 402 to provide a final updated segmentation 414.

Figure 5:
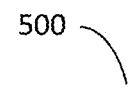
FIG. 5 shows a workflow for generating an updated segmentation of an anatomical object in a three-dimensional (3D) input medical image, in accordance with one or more embodiments.
Figure 5:
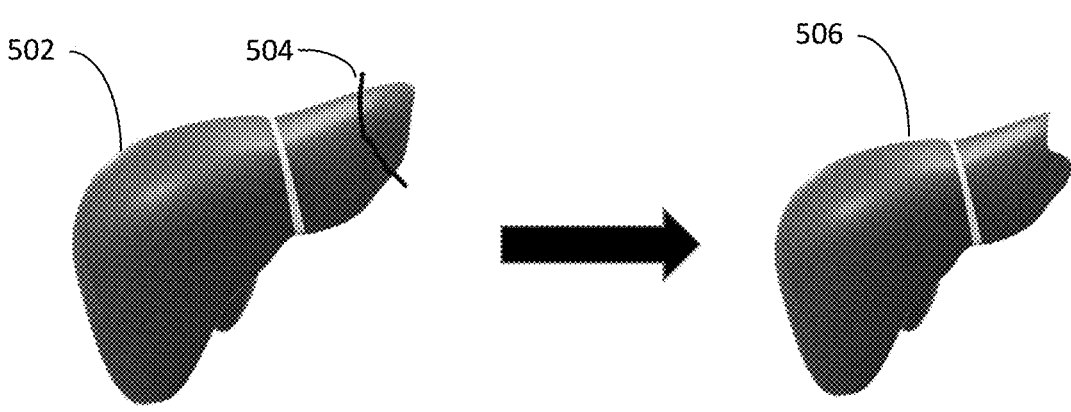

FIG. 5 shows a workflow 500 for generating an updated segmentation of an anatomical object in a three-dimensional (3D) input medical image, in accordance with one or more embodiments. User input 504 is defined on a 3D initial segmentation 502 by a user drawing an input stroke in a 3D coordinate system. An updated segmentation 506 is generated according to method 100 of FIG. 1. In one embodiment, for 3D editing, the user can provide an input stroke or an outline where the correction is applied directly on the 3D representation of the data. This includes, but is not limited to, providing an input stroke intersecting a 3D mesh or directly manipulating the mesh vertices or triangles, Alternatively, the user can use a paint brush editing tool to highlight parts of the body that need to be removed or parts of the background that need to be added.

In one embodiment, projections of the 3D segmentation are visualized on the 2D image slices in a particular modality. This enables the user to see where the detected boundaries are relative to the original images. The user can then provide input to the editing on the 2D images.

Figure 6:
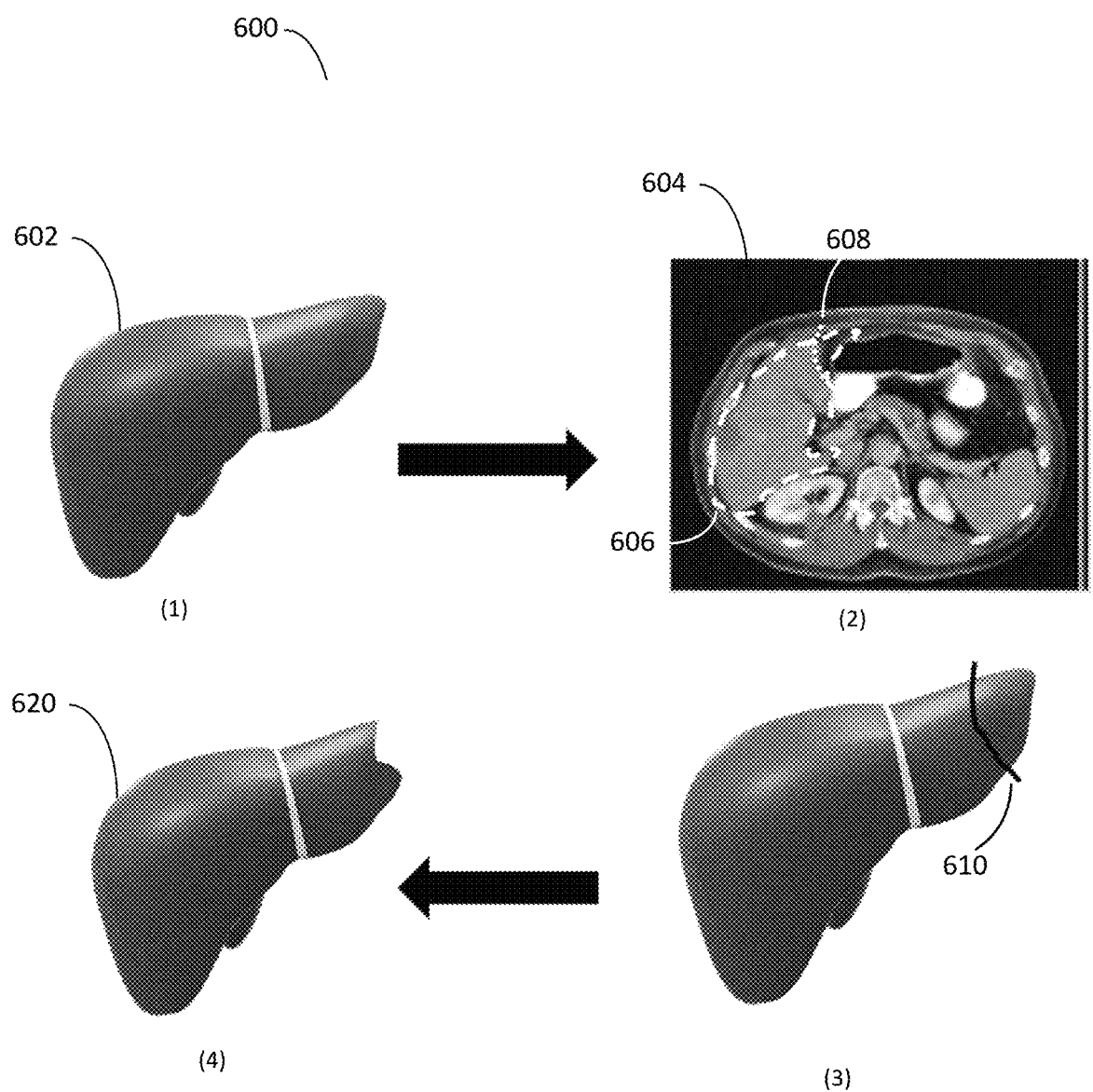
FIG. 6 shows an illustration of the 3D segmentation process with corrected 2D user input, in accordance with one or more embodiments.

FIG. 6 shows a workflow 600 for generating an updated segmentation of an anatomical object in a 3D input medical image based on user input received on a 2D slice of the 3D input medical image, in accordance with one or more embodiments. At step (1), a 3D initial segmentation 602 is received. At step (2), user input is received on a 2D slice 604 of the 3D input medical image. 2D slice 604 shows a 2D initial segmentation 606 of the 3D initial segmentation 602. The user may view the initial segmentation 606 and draw a stroke 608 for modifying the 2D initial segmentation 606. At step (3), the user input 608 is mapped to the 3D initial segmentation 602 as 3D user input 610. At step (4), a 3D updated segmentation 620 is generated according to method

100 of FIG. 1 using the 3D input medical image as the input medical image, the 3D initial segmentation as the initial segmentation, and the 3D user input 610 as the user input.

It is noted that the 2D user inputs impact the vicinity of the input in 3D and not just the slice where the input is drawn. The contours used for editing can be generated using another automatic algorithm. For example, an automatic 2D segmentation algorithm can be used to generate the 2D segmentation contours. The generated contours may then be used as input to the editing algorithm to generate a 3D segmentation, hence producing a final 3D surface and a providing regularization in 3D.

A more comprehensive editing system can be formed by combining 2D and 3D editing pipelines and introducing iterative editing to obtain optimal results. For example, a 2D editing component can be constructed to provide a refined 2D segmentation from 2D input contours, where the 2D contours can either be provided by user input strokes or generated automatically by an algorithm. A 3D editing component can then be established to produce a refined 3D segmentation based on the 2D input contours. A more comprehensive iterative editing pipeline can be formed by combining the 2D editing component and the 3D editing component in an iterative way. For example, the output from the 2D editing can be used as the input contours to the 3D editing, and the projection of the 3D edited volumes can be used as the input strokes to the 2D editing algorithm. The number of iterations that alternates between the 2D and 3D editing can be predefined by the user. Alternatively, a stopping criterion can be designed. One example is to use the distance between the input contours and the editing contours as a threshold stopping criterion. Other criteria may be used.

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based system can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning algorithm can be adapted iteratively by several steps of training.

In particular, a trained machine learning based systems can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 7:
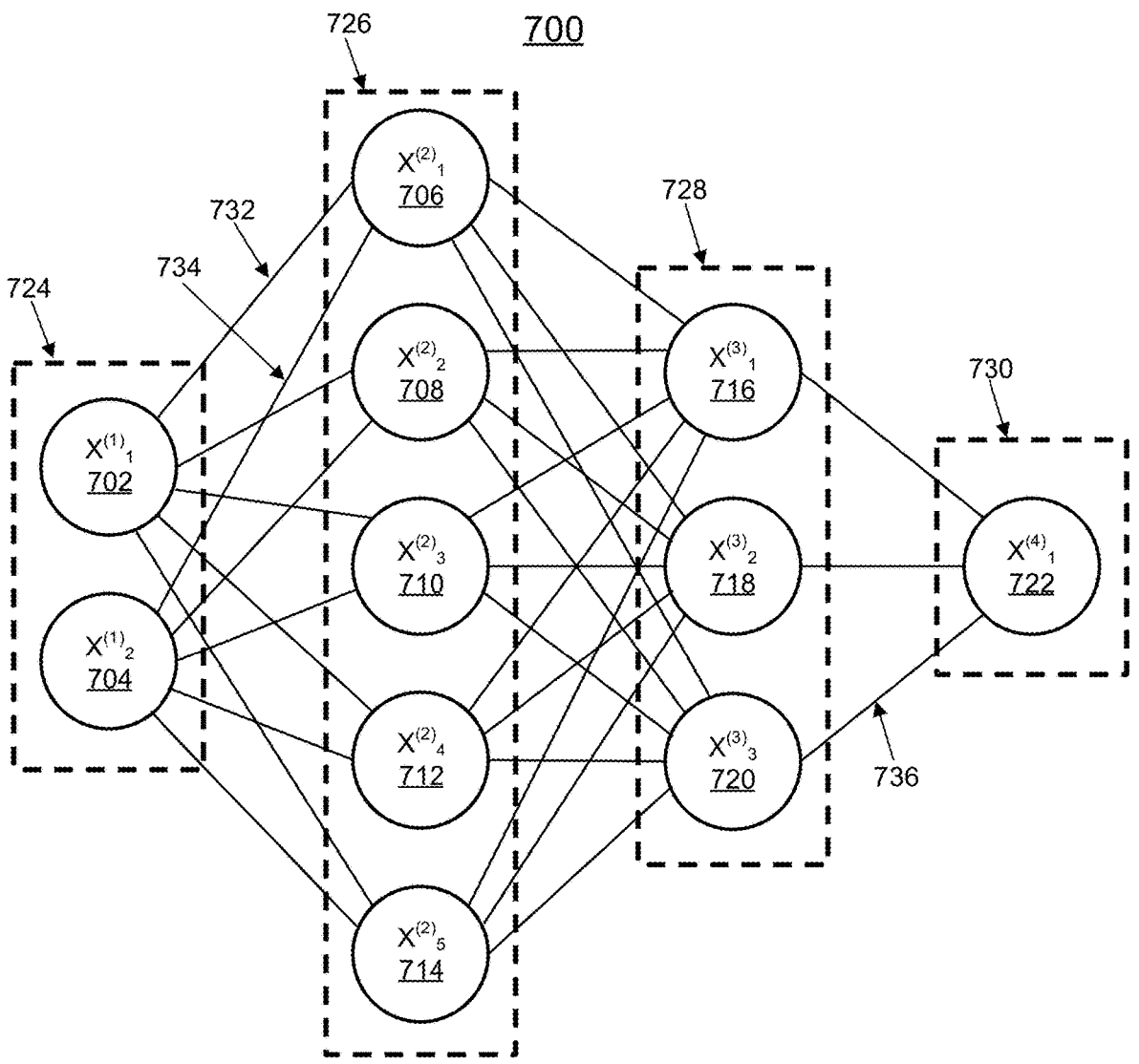
FIG. 7 shows an exemplary artificial neural network that may be used to implement one or more embodiments.

FIG. 7 shows an embodiment of an artificial neural network 700, in accordance with one or more embodiments. Alternative terms for "artificial neural network" are "neural network", "artificial neural net" or "neural net". Machine learning networks described herein, such as, e.g., the machine learning based networks utilized in method 100 of FIG. 1 and workflow 200 of FIG. 2, may be implemented using artificial neural network 700.

The artificial neural network 700 comprises nodes 702-722 and edges 732, 734, . . . , 736, wherein each edge 732, 734, . . . , 736 is a directed connection from a first node 702-722 to a second node 702-722. In general, the first node 702-722 and the second node 702-722 are different nodes 702-722, it is also possible that the first node 702-722 and the second node 702-722 are identical. For example, in FIG. 7, the edge 732 is a directed connection from the node 702 to the node 706, and the edge 734 is a directed connection from the node 704 to the node 706. An edge 732, 734, . . . , 736 from a first node 702-722 to a second node 702-722 is also denoted as "ingoing edge" for the second node 702-722 and as "outgoing edge" for the first node 702-722.

In this embodiment, the nodes 702-722 of the artificial neural network 700 can be arranged in layers 724, 726, 7128, and 730, wherein the layers can comprise an intrinsic order introduced by the edges 732, 734, . . . , 736 between the nodes 702-722. In particular, edges 732, 734, . . . , 736 can exist only between neighboring layers of nodes. In the embodiment shown in FIG. 7, there is an input layer 724 comprising only nodes 702 and 704 without an incoming edge, an output layer 730 comprising only node 722 without outgoing edges, and hidden layers 726, 728 in-between the input layer 724 and the output layer 730. In general, the number of hidden layers 726, 728 can be chosen arbitrarily. The number of nodes 702 and 704 within the input layer 724 usually relates to the number of input values of the neural network 700, and the number of nodes 722 within the output layer 730 usually relates to the number of output values of the neural network 700.

In particular, a (real) number can be assigned as a value to every node 702-722 of the neural network 700. Here, $x^{(n)}_i$ denotes the value of the i-th node 702-722 of the n-th layer 724-730. The values of the nodes 702-722 of the input layer 724 are equivalent to the input values of the neural network 700, the value of the node 722 of the output layer 730 is equivalent to the output value of the neural network 700.

Furthermore, each edge 732, 734, . . . , 736 can comprise a weight being a real number, in particular, the weight is a real number within the interval [−1, 1] or within the interval [0, 1]. Here, $w^{(m-n)}{}_{i,j}$ denotes the weight of the edge between the i-th node 702-722 of the m-th layer 724-730 and the j-th node 702-722 of the n-th layer 724-730. Furthermore, the abbreviation $w^{(n)}{}_{i,j}$ is defined for the weight $w^{(n,n+1)}{}_{i,j}$.

In particular, to calculate the output values of the neural network 700, the input values are propagated through the neural network. In particular, the values of the nodes 702-722 of the (n+1)-th layer 724-730 can be calculated based on the values of the nodes 702-722 of the n-th layer 724-730 by $$x_j^{(n+1)}=f(\Sigma_i x_i^{(n)}\cdot w_{i,j}^{(n)}).$$

Herein, the function $f$ is a transfer function (another term is "activation function"). Known transfer functions are step functions, sigmoid function (e.g. the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 724 are given by the input of the neural network 700, wherein values of the first hidden layer 726 can be calculated based on the values of the input layer 724 of the neural network, wherein values of the second hidden layer 728 can be calculated based in the values of the first hidden layer 726, etc.

In order to compute the values $w^{(m,n)}{}_{i,j}$ for the edges, the neural network 700 has to be trained using training data. In particular, training data comprises training input data and training output data (denoted as $t_i$). For a training step, the neural network 700 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 700 (backpropagation algorithm). In particular, the weights are changed according to $$w_{i,j}^{1(n)}=w_{i,j}^{(n)}-\gamma\cdot\delta_j^{(n)}\cdot x_i^{(n)}$$

wherein $\gamma$ is a learning rate, and the numbers $\delta^{(n)}{}_j$ can be recursively calculated as $$\delta_j^{(n)}=(\Sigma_k\delta_k^{(n+1)}\cdot w_{j,k}^{(n+1)})\cdot f^1(\Sigma_i x_i^{(n)}\cdot w_{i,j}^{(n)})$$

based on $\delta^{(n+1)}{}_j$, if the (n+1)-th layer is not the output layer, and $$\delta_j^{(n)}=(x_k^{(n+1)}-t_j^{(n+1)})\cdot f^1(\Sigma_i x_i^{(n)}\cdot w_{i,j}^{(n)})$$

if the (n+1)-th layer is the output layer 730, wherein $f'$ is the first derivative of the activation function, and $y^{(n+1)}{}_j$ is the comparison training value for the j-th node of the output layer 730.

Figure 8:
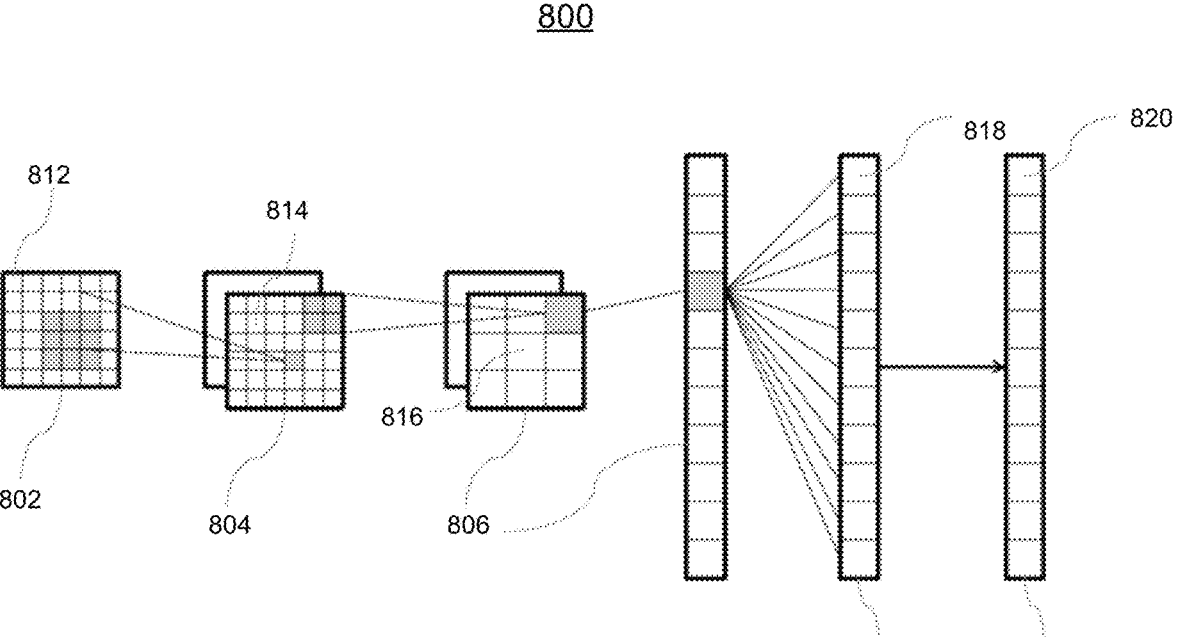
FIG. 8 shows a convolutional neural network that may be used to implement one or more embodiments.

FIG. 8 shows a convolutional neural network 800, in accordance with one or more embodiments. Machine learning networks described herein, such as, e.g., the machine learning based networks utilized in method 100 of FIG. 1 and workflow 200 of FIG. 2, may be implemented using convolutional neural network 800.

In the embodiment shown in FIG. 8, the convolutional neural network comprises 800 an input layer 802, a convolutional layer 804, a pooling layer 806, a fully connected layer 808, and an output layer 810. Alternatively, the convolutional neural network 800 can comprise several convolutional layers 804, several pooling layers 806, and several fully connected layers 808, as well as other types of layers. The order of the layers can be chosen arbitrarily, usually fully connected layers 808 are used as the last layers before the output layer 810.

In particular, within a convolutional neural network 800, the nodes 812-820 of one layer 802-810 can be considered to be arranged as a d-dimensional matrix or as a d-dimensional image. In particular, in the two-dimensional case the value of the node 812-820 indexed with i and j in the n-th layer 802-810 can be denoted as $x^{(n)}{}_{)[i,j]}$. However, the arrangement of the nodes 812-820 of one layer 802-810 does not have an effect on the calculations executed within the convolutional neural network 800 as such, since these are given solely by the structure and the weights of the edges.

In particular, a convolutional layer 804 is characterized by the structure and the weights of the incoming edges forming a convolution operation based on a certain number of kernels. In particular, the structure and the weights of the incoming edges are chosen such that the values $x^{(n)}{}_k$ of the nodes 814 of the convolutional layer 804 are calculated as a convolution $x^{(n)}{}_k=K_k*x^{(n-1)}$ based on the values $x^{(n-1)}$ of the nodes 812 of the preceding layer 802, where the convolution * is defined in the two-dimensional case as $$x_k^{(n)}[i,j]=K_k*x^{(n-1)}[i,j]=\Sigma_i\Sigma_j K_k[i',j']\cdot x^{(n-1)}[i-i',j-j'].$$

Here the k-th kernel $K_k$ is a d-dimensional matrix (in this embodiment a two-dimensional matrix), which is usually small compared to the number of nodes 812-818 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 812-820 in the respective layer 802-810. In particular, for a convolutional layer 804, the number of nodes 814 in the convolutional layer is equivalent to the number of nodes 812 in the preceding layer 802 multiplied with the number of kernels.

If the nodes 812 of the preceding layer 802 are arranged as a d-dimensional matrix, using a plurality of kernels can be interpreted as adding a further dimension (denoted as "depth" dimension), so that the nodes 814 of the convolutional layer 804 are arranged as a (d+1)-dimensional matrix. If the nodes 812 of the preceding layer 802 are already arranged as a (d+1)-dimensional matrix comprising a depth dimension, using a plurality of kernels can be interpreted as expanding along the depth dimension, so that the nodes 814 of the convolutional layer 804 are arranged also as a (d+1)-dimensional matrix, wherein the size of the (d+1)-dimensional matrix with respect to the depth dimension is by a factor of the number of kernels larger than in the preceding layer 802.

The advantage of using convolutional layers 804 is that spatially local correlation of the input data can exploited by enforcing a local connectivity pattern between nodes of adjacent layers, in particular by each node being connected to only a small region of the nodes of the preceding layer.

In embodiment shown in FIG. 8, the input layer 802 comprises 36 nodes 812, arranged as a two-dimensional 6×6 matrix. The convolutional layer 804 comprises 72 nodes 814, arranged as two two-dimensional 6×6 matrices, each of the two matrices being the result of a convolution of the values of the input layer with a kernel. Equivalently, the nodes 814 of the convolutional layer 804 can be interpreted as arranges as a three-dimensional 6×6×2 matrix, wherein the last dimension is the depth dimension.

A pooling layer 806 can be characterized by the structure and the weights of the incoming edges and the activation function of its nodes 816 forming a pooling operation based on a non-linear pooling function $f$. For example, in the two dimensional case the values $x^{(n)}$ of the nodes 816 of the pooling layer 806 can be calculated based on the values $x^{(n-1)}$ of the nodes 814 of the preceding layer 804 as $$x^{(n)}[i,j]=f(x^{(n-1)}[id_1,jd_2], \ldots , x^{(n-1)}[id_1+d_1-1,jd_2+d_2-1])$$

In other words, by using a pooling layer 806, the number of nodes 814, 816 can be reduced, by replacing a number d1·d2 of neighboring nodes 814 in the preceding layer 804 with a single node 816 being calculated as a function of the values of said number of neighboring nodes in the pooling layer. In particular, the pooling function $f$ can be the max-function, the average or the L2-Norm. In particular, for a pooling layer 806 the weights of the incoming edges are fixed and are not modified by training.

The advantage of using a pooling layer 806 is that the number of nodes 814, 816 and the number of parameters is reduced. This leads to the amount of computation in the network being reduced and to a control of overfitting.

In the embodiment shown in FIG. 8, the pooling layer 806 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 808 can be characterized by the fact that a majority, in particular, all edges between nodes 816 of the previous layer 806 and the nodes 818 of the fully-connected layer 808 are present, and wherein the weight of each of the edges can be adjusted individually.

In this embodiment, the nodes 816 of the preceding layer 806 of the fully-connected layer 808 are displayed both as two-dimensional matrices, and additionally as non-related nodes (indicated as a line of nodes, wherein the number of nodes was reduced for a better presentability). In this embodiment, the number of nodes 818 in the fully connected layer 808 is equal to the number of nodes 816 in the preceding layer 806. Alternatively, the number of nodes 816, 818 can differ.

Furthermore, in this embodiment, the values of the nodes 820 of the output layer 810 are determined by applying the softmax function onto the values of the nodes 818 of the preceding layer 808. By applying the softmax function, the sum the values of all nodes 820 of the output layer 810 is 1, and all values of all nodes 820 of the output layer are real numbers between 0 and 1.

A convolutional neural network 800 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 800 can be trained based on the backpropagation algorithm. For preventing overfitting, methods of regularization can be used, e.g., dropout of nodes 812-820, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatuses, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 1. Certain steps or functions of the methods and workflows described herein, including one or more of the steps or functions of FIG. 1, may be performed by a server or by another processor in a network-based cloud-computing system. Certain steps or functions of the methods and workflows described herein, including one or more of the steps of FIG. 1, may be performed by a client computer in a network-based cloud computing system. The steps or functions of the methods and workflows described herein, including one or more of the steps of FIG. 1, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 1, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A high-level block diagram of an example computer 902 that may be used to implement systems, apparatus, and methods described herein is depicted in FIG. 1. Computer 902 includes a processor 904 operatively coupled to a data storage device 912 and a memory 910. Processor 904 controls the overall operation of computer 902 by executing computer program instructions that define such operations. The computer program instructions may be stored in data storage device 912, or other computer readable medium, and loaded into memory 910 when execution of the computer program instructions is desired. Thus, the method and workflow steps or functions of FIG. 1 can be defined by the computer program instructions stored in memory 910 and/or data storage device 912 and controlled by processor 904 executing the computer program instructions. For example, the computer program instructions can be implemented as computer executable code programmed by one skilled in the art to perform the method and workflow steps or functions of FIG. 1. Accordingly, by executing the computer program instructions, the processor 904 executes the method and workflow steps or functions of FIG. 1. Computer 902 may also include one or more network interfaces 906 for communicating with other devices via a network. Computer 902 may also include one or more input/output devices 908 that enable user interaction with computer 902 (e.g., display, keyboard, mouse, speakers, buttons, etc.).

Processor 904 may include both general and special purpose microprocessors, and may be the sole processor or one of multiple processors of computer 902. Processor 904 may include one or more central processing units (CPUs), for example. Processor 904, data storage device 912, and/or memory 910 may include, be supplemented by, or incorporated in, one or more application-specific integrated circuits (ASICs) and/or one or more field programmable gate arrays (FPGAs).

Data storage device 912 and memory 910 each include a tangible non-transitory computer readable storage medium. Data storage device 912, and memory 910, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 908 may include peripherals, such as a printer, scanner, display screen, etc. For example, input/output devices 908 may include a display device such as a cathode ray tube (CRT) or liquid crystal display (LCD)

monitor for displaying information to the user; and a keyboard, a pointing device such as a mouse or a trackball, a light pen, or touch screen by which the user can provide input to computer 902.

An image acquisition device 914 can be connected to the computer 902 to input image data (e.g., medical images) to the computer 902. It is possible to implement the image acquisition device 914 and the computer 902 as one device. It is also possible that the image acquisition device 914 and the computer 902 communicate wirelessly through a network. In a possible embodiment, the computer 902 can be located remotely with respect to the image acquisition device 914.

Any or all of the systems and apparatus discussed herein may be implemented using one or more computers such as computer 902.

Figure 9:
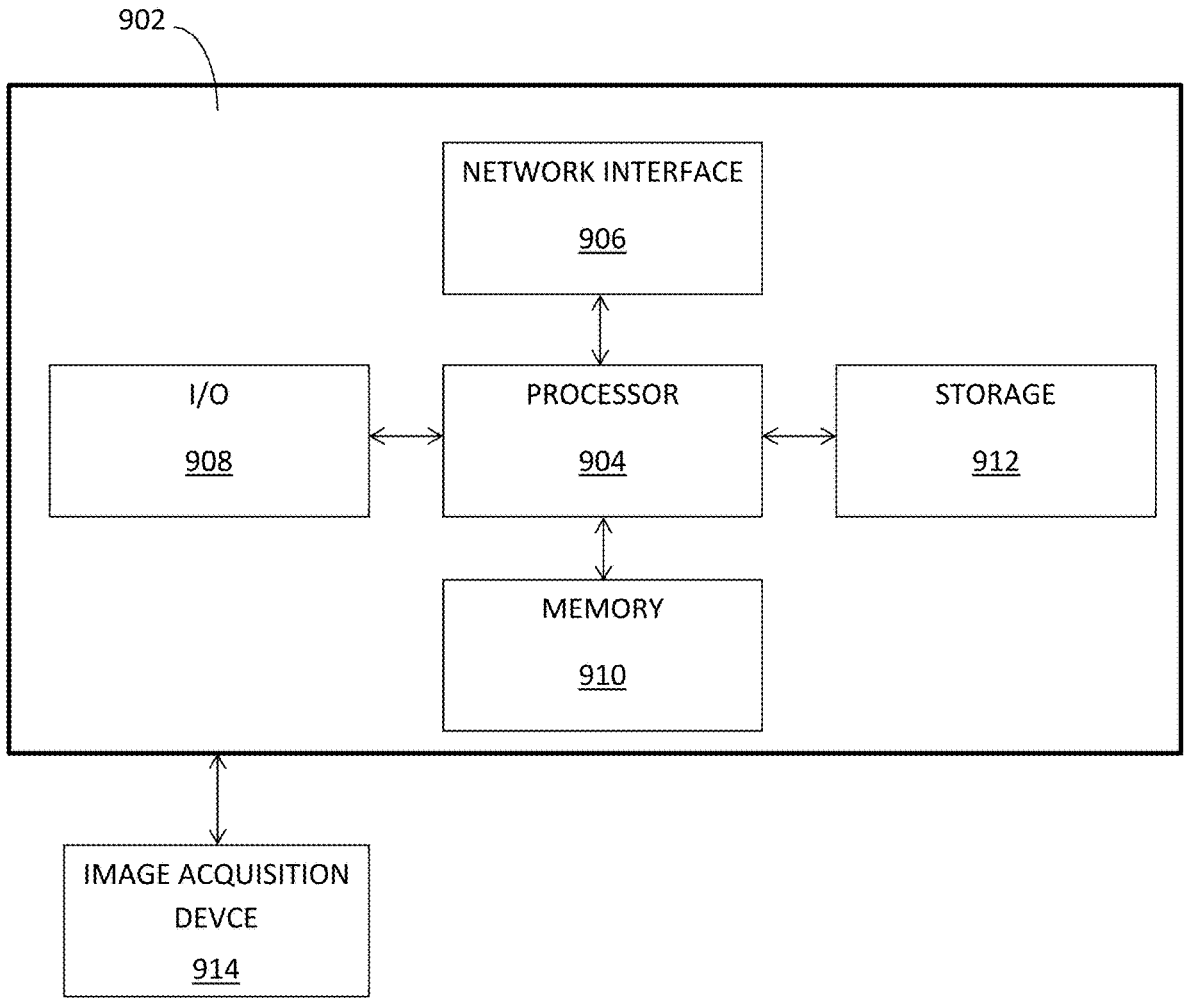
FIG. 9 shows a high-level block diagram of a computer that may be used to implement one or more embodiments.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A computer-implemented method, comprising:
   receiving an initial segmentation of an anatomical object from an input medical image;
   receiving user input modifying the initial segmentation;
   cropping a region of the input medical image around the user input;
   generating an updated segmentation of the anatomical object in the input medical image using a machine learning based network, the machine learning based network receiving as input, via respective input channels, the cropped region of the input medical image, the initial segmentation, and the user input, and generating as output the updated segmentation, wherein each of the input channels is weighted to assign an importance of the cropped region of the input medical image, the initial segmentation, and the user input;
   stitching the updated segmentation to the initial segmentation in the region to provide a final segmentation; and
   outputting the final segmentation.

2. The computer-implemented method of claim 1, wherein:
   receiving an initial segmentation of an anatomical object from an input medical image comprises:
      receiving a 3D (three dimensional) initial segmentation of the anatomical object from a 3D volume; and
   receiving user input modifying the initial segmentation comprises:
      receiving the user input on a 2D (two dimensional) slice of the 3D volume, and
      mapping the user input from the 2D slice to the 3D initial segmentation.

3. The computer-implemented method of claim 1, wherein:

receiving an initial segmentation of an anatomical object from an input medical image comprises:

receiving a 3D (three dimensional) initial segmentation of the anatomical object from a 3D volume; and receiving user input modifying the initial segmentation comprises:

receiving the user input modifying the 3D initial segmentation in a 3D coordinate system.

4. The computer-implemented method of claim 1, wherein:

receiving user input modifying the initial segmentation comprises receiving a plurality of user inputs modifying the initial segmentation; and generating an updated segmentation of the anatomical object in the input medical image using a machine learning based network comprises generating the updated segmentation of the anatomical object in the input medical image based on the plurality of user inputs.

5. The computer-implemented method of claim 1, further comprising:

receiving one or more additional user inputs; and for each respective additional user input of the one or more additional user inputs, iteratively repeating the steps of receiving the initial segmentation, receiving the user input, cropping the region of the input medical image, generating the updated segmentation, stitching the updated segmentation to the initial segmentation, and outputting the final segmentation using the respective additional user input as the user input and the final segmentation as the initial segmentation.

6. The computer-implemented method of claim 1, wherein receiving user input modifying the initial segmentation comprises:

receiving user input adding a new contour to the initial segmentation, deleting a portion of the initial segmentation, or moving a portion of the initial segmentation.

7. An apparatus, comprising:

means for receiving an initial segmentation of an anatomical object from an input medical image;

means for receiving user input modifying the initial segmentation;

means for cropping a region of the input medical image around the user input;

means for generating an updated segmentation of the anatomical object in the input medical image using a machine learning based network, the machine learning based network receiving as input, via respective input channels, the cropped region of the input medical image, the initial segmentation, and the user input, and generating as output the updated segmentation, wherein each of the input channels is weighted to assign an importance of the cropped region of the input medical image, the initial segmentation, and the user input;

means for stitching the updated segmentation to the initial segmentation in the region to provide a final segmentation; and means for outputting the final segmentation.

8. The apparatus of claim 7, wherein:

the means for receiving an initial segmentation of an anatomical object from an input medical image comprises:

means for receiving a 3D (three dimensional) initial segmentation of the anatomical object from a 3D volume; and the means for receiving user input modifying the initial segmentation comprises:

means for receiving the user input on a 2D (two dimensional) slice of the 3D volume, and means for mapping the user input from the 2D slice to the 3D initial segmentation.

9. The apparatus of claim 7, wherein:

the means for receiving user input modifying the initial segmentation comprises means for receiving a plurality of user inputs modifying the initial segmentation; and the means for generating an updated segmentation of the anatomical object in the input medical image using a machine learning based network comprises means for generating the updated segmentation of the anatomical object in the input medical image based on the plurality of user inputs.

10. The apparatus of claim 7, further comprising:

means for receiving one or more additional user inputs; and for each respective additional user input of the one or more additional user inputs, means for iteratively repeating the steps of receiving the initial segmentation, receiving the user input, cropping the region of the input medical image, generating the updated segmentation, stitching the updated segmentation to the initial segmentation, and outputting the final segmentation using the respective additional user input as the user input and the final segmentation as the initial segmentation.

11. The apparatus of claim 7, wherein the means for receiving user input modifying the initial segmentation comprises:

means for receiving user input adding a new contour to the initial segmentation, deleting a portion of the initial segmentation, or moving a portion of the initial segmentation.

12. A non-transitory computer readable medium storing computer program instructions, the computer program instructions when executed by a processor cause the processor to perform operations comprising:

receiving an initial segmentation of an anatomical object from an input medical image;

receiving user input modifying the initial segmentation;

cropping a region of the input medical image around the user input;

generating an updated segmentation of the anatomical object in the input medical image using a machine learning based network, the machine learning based network receiving as input, via respective input channels, the cropped region of the input medical image, the initial segmentation, and the user input, and generating as output the updated segmentation, wherein each of the input channels is weighted to assign an importance of the cropped region of the input medical image, the initial segmentation, and the user input;

stitching the updated segmentation to the initial segmentation in the region to provide a final segmentation; and outputting the final segmentation.

13. The non-transitory computer readable medium of claim 12, wherein receiving user input modifying the initial segmentation comprises:

receiving user input adding a new contour to the initial segmentation, deleting a portion of the initial segmentation, or moving a portion of the initial segmentation.

* * * * *